April 2, 1968

F. L. ROSE 3,375,822

SURGICAL CAST AND METHOD OF FORMING
AND APPLYING TO A BODY MEMBER

Filed Feb. 19, 1965

FRANK L. ROSE
*INVENTOR.*

BY Alden D. Redfield
Aubry C. Brine
ATTORNEYS

United States Patent Office 3,375,822
Patented Apr. 2, 1968

3,375,822
SURGICAL CAST AND METHOD OF FORMING AND APPLYING TO A BODY MEMBER
Frank L. Rose, Reading, Mass., assignor to Avco Corporation, Cincinnati, Ohio, a corporation of Delaware
Filed Feb. 19, 1965, Ser. No. 433,979
19 Claims. (Cl. 128—90)

ABSTRACT OF THE DISCLOSURE

A surgical cast which is formed directly on a body member. The cast when formed comprises low density particulated material bonded together by a suitable bonding agent. The cast components are stored in a plastic or other suitable container in a dormant, unreactive state. To form a cast, the components are mixed, reacted, and molded on the body, preferably within the plastic container.

---

Heretofore, a common surgical cast for use in immobilizing a body member during repair of broken bones, etc., has been the type wherein a plaster or other heavy materials are employed. Such materials as plaster of Paris are generally used to manufacture a rigid cast and the application of such materials in general requires a special room and equipment. In addition, these casts are generally opaque with respect to X-rays, which generally makes it impossible to determine whether the broken bone within the cast is setting properly.

Various attempts have been made at employing light-weight casts formed of plastic material. While many of the objectionable features of the plaster cast have been overcome by these plastic casts, there have been many features present in these plastic casts which have limited their general acceptability.

It is, therefore, an object of the present invention to provide an improved surgical cast which is easy to apply without the need for special equipment.

Another object of the invention is to provide a light-weight plastic cast which is formed directly on the body member.

A further object of the invention is to provide a method of forming and applying a surgical cast to a body member wherein the cast material does not contact the operator or the body member being operated on.

Yet another object of the invention is to provide an article of manufacture for use as a surgical cast which article is easily stored and has a substantially long shelf life.

These objects of the invention, and other objects which will be apparent as the description proceeds, are achieved by providing a sealed envelope of pliable material, having contained therein a low-density filler material and a dormant hardenable binding agent. The pliable envelope may be stored for an extended period of time, until it is needed for use as a cast.

To manufacture a cast, the operator introduces an activating agent to the binding agent which remains in the sealed envelope. The mass within the envelope is then thoroughly mixed by kneading, and the envelope is placed adjacent the body member, where it may be held in place by taping or other means.

Figure 1:
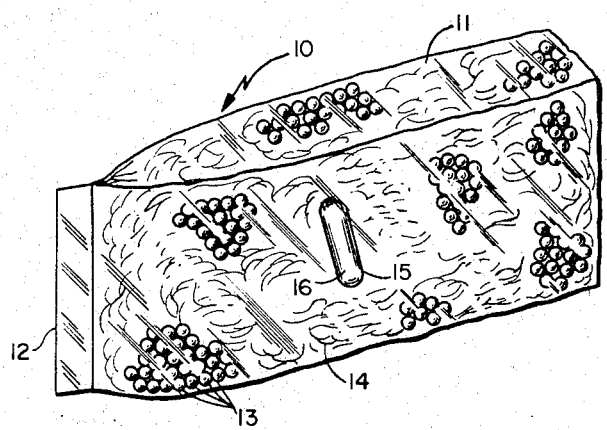
Figure 2:
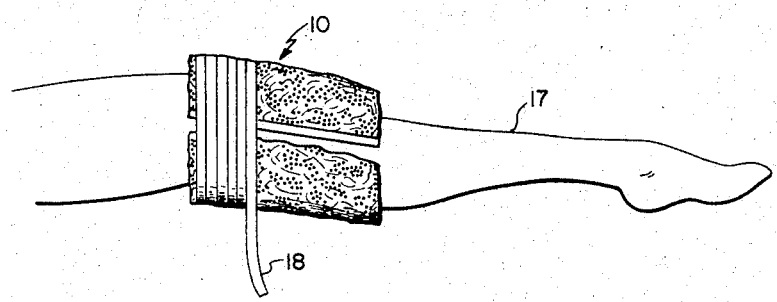

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIGURE 1 is a perspective view showing an article manufactured in accordance with the present invention; and FIGURE 2 is an elevational view showing a body member to which the article shown in FIGURE 1 has been applied.

Referring to FIGURE 1 of the drawings, there is shown an article 10 comprising a pliable envelope 11 having an open end which has been sealed to provide the end portion 12. The envelope 11 may be manufactured of any thin pliable material, but is preferably of a transparent poly-vinyl plastic.

Within the envelope 11 there is provided a low-density filler material in the form of a plurality of beads 13. The beads are approximately 1/8" in diameter and may be of expanded polystyrene material to produce a small weight to volume ratio.

Also included in the envelope 11 is a normally dormant binding agent 14. There are a number of such agents on the market today which are generally characterized by their reaction with a suitable activator to provide a binder resin material. A semi-prepolymer comprising a polypropylene oxide adduct or trimethylol propane forms a suitable binding agent, which produces low exotherm during the forming process.

It should here be noted, it is a desirable property of the binding agent 14 that it produce low exotherm during activation to prevent the injured body member from excessive heat during application of the cast. However, should the reaction of the chosen binding agent 14 in producing a rigid binder resin material produce an exotherm of uncomfortable proportions to the patient, a layer of insulating material may be wound around the body member prior to application of the article 10.

In addition to the beads 13 and the binding agent 14, a capsule 15 is provided within the envelope 11. The capsule contains an activating agent 16. When forming a polyurethane resin wherein the binding agent is a semi-prepolymer, the activating agent 16 is a polyol which may be polyether derived from sorbitol and propylene oxide. The aforementioned compounds which are employed to form rigid polyurethane composition are sold under a number of trade names which are well known to one familiar with the art.

It is desirable that the polyurethane composition have a set time from 5 to 20 minutes to enable proper mixing of the mass within the envelope 11 and subsequent application to the injured body member prior to hardening. To insure proper set time, a catalyst is generally introduced to the polyurethane resin in a quantity necessary to control the rate of reaction between the binding agent and the activating agent. When such catalyst is employed, it is generally included in the capsule 15 and introduced together with the activating agent 16 to the binding agent 14.

To introduce the activating agent 16 to the binding agent 14, it is necessary to open the capsule while the capsule remains in the sealed envelope 11. The capsule 15 is therefore manufactured from a relatively brittle plastic, which may be floating freely in the binder agent 14 and the beads 13, or attached to the inner surface of the envelope, for easier handling through the envelope wall.

The capsule 15 may also be formed of a polypropylene material which when held against an inner surface of the envelope 11, releases its contents under the application of suitable pressure through the envelope walls.

After releasing the activating agent 16 to the contents of the envelope 11, the envelope is kneaded to insure that the activating agent is distributed throughout the mass within the envelope. By providing a coloring agent to the activating agent 16 and providing a transparent envelope 11, it is possible to insure distribution of the activator 16 throughout the mass by kneading the envelope until the mass is of a uniform color.

Referring to FIGURE 2 it will be noted that after kneading the envelope 11, and prior to hardening of the binder, the article 10 is placed adjacent the body member 17 where it is held until a substantially rigid cast is formed. The article 10 may be held in place by the application of tape 18 or by any suitable clamping arrangement well known in the art.

It should also be obvious that although a single article 10 is shown employed to form the cast of FIGURE 2, that a cast could be made up of a plurality of such articles 10 which when applied to the body member and held or taped in place as shown in FIGURE 2 serve as a unitary, substantially rigid cast.

Although the normally dormant binding agent 14 has been herein described as a semi-prepolymer, acceptable results have been obtained with the use of a binding agent of epoxy resin, employing a suitable resin hardener as the activating agent 16. Such epoxy resins and hardeners are available on the market under various trade names and are well known to those familiar with the art.

Another method of introducing the activating agent 16 to the binding agent 14 is by employing a hypodermic needle containing the activating agent, in which case the capsule 15 is eliminated from the article 10. The article 10 is then manufactured containing only the binding agent 14 and the filler 13. When it is desired to activate the binding agent 14, the hypodermic needle is inserted through the envelope 11 and the activating agent 16 is introduced therethrough. On removal of the needle, the opening caused by the needle is sealed by the activating agent and binder, and leakage does not occur.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:
1. A surgical cast for use on a body member comprising;
 a sealed envelope having a surface disposable adjacent a body member and conformable thereto,
 a plurality of low-density spheres contained in said envelope, and
 a binder material interspersed among said spheres throughout the interior of said envelope bonding said spheres to each other and to said container.

2. A surgical cast for use on a body member comprising;
 a sealed envelope having a surface disposable adjacent a body member and conformable thereto,
 a plurality of polystyrene beads disposed in said envelope, and
 a binder material interspersed among said beads throughout the interior of said envelope bonding said beads to each other and to said container.

3. A surgical cast as described in claim 2 wherein said binder material is a polyurethane resin.

4. A surgical cast as described in claim 2 wherein said binder material is an epoxy resin.

5. A surgical cast for use on a body member comprising;
 a sealed poly-vinyl plastic envelope having a surface disposable adjacent a body member and conformable thereto,
 a plurality of polystyrene beads disposed in said envelope, and
 a binder material interspersed among said beads throughout the interior of said envelope bonding said beads to each other and to said envelope for providing a substantially rigid cast.

6. A surgical cast as described in claim 5 wherein said binder material is a polyurethane resin.

7. A surgical cast as described in claim 5 wherein said binder material is an epoxy resin.

8. A method of forming and applying a surgical cast to a body member which comprises;
 providing a sealed pliable envelope having a low-density filler material and a normally dormant hardenable binding agent contained therein,
 activating the binding agent while in said sealed envelope, applying a surface of the envelope to a body member, and
 holding said envelope surface adjacent the body member during hardening of the binding agent to form a substantially rigid cast.

9. A method of forming and applying a surgical cast to a body member which comprises;
 providing a sealed pliable envelope having a plurality of polystyrene beads and a normally dormant hardenable binding agent contained therein,
 introducing an activating agent to the binding agent while in said sealed envelope,
 applying a surface of the envelope to a body member, and
 holding said envelope surface adjacent the body member during hardening of the binding agent to form a substantially rigid cast.

10. A method of forming and applying a surgical cast to a body member which comprises;
 providing a sealed envelope having a plurality of polystyrene beads, a normally dormant hardenable binding agent and a sealed capsule of activating agent, contained therein,
 opening the capsule while in the sealed envelope to release the activating agent to the binding agent,
 kneading the envelope to uniformly distribute the activating agent throughout the mass within the envelope, applying a surface of the envelope to a body member, and
 holding said envelope surface adjacent the body member during hardening of the binding agent to form a substantially rigid cast.

11. A method of forming and applying a surgical cast to a body member which comprises;
 providing a sealed envelope having a plurality of polystyrene beads, a normally dormant hardenable epoxy resin and a sealed capsule of resin activator contained therein,
 opening the capsule while in the sealed envelope to release the activator to the resin,
 kneading the envelope to uniformly distribute the activator throughout the mass within the envelope, applying a surface of the envelope to a body member, and
 holding said envelope surface adjacent the body member during hardening of the epoxy binder to form a substantially rigid cast.

12. A method of forming and applying a surgical cast to a body member which comprises;
 providing a sealed envelope having a plurality of polystyrene beads, a normally dormant hardenable semi-prepolymer and a sealed capsule of polyol activator, contained therein,
 opening the capsule while in the sealed envelope to release the polyol activator to the semi-prepolymer,
 kneading the envelope to uniformly distribute the activator throughout the mass within the envelope,
 applying a surface of the envelope to a body member, and
 holding said envelope adjacent the body member during hardening of the polyurethane binder to form a substantially rigid cast.

13. A method of forming and applying a surgical cast to a body member which comprises;
   providing a sealed transparent envelope containing a plurality of polystyrene beads, a normally dormant hardenable binding agent and a sealed capsule containing activating agent and coloring agent,
   opening the capsule while in the sealed envelope to introduce the activating agent and coloring agent to the binding agent,
   kneading the envelope to produce a uniform color of the mass within the envelope,
   applying a surface of the envelope to a body member, and
   holding said envelope surface adjacent the body member during hardening of the binding agent to form a substantially rigid cast.

14. An article of manufacture for use as a surgical cast which comprises;
   a sealed pliable envelope having a low-density particulate filler material and a normally dormant and hardenable binding agent contained therein which upon hardening of said agent produces a substantially rigid cast.

15. An article of manufacture for use as a surgical cast which comprises;
   a sealed pliable envelope having a plurality of polystyrene beads and a dormant epoxy resin contained therein which upon activation of the epoxy resin produces a substantially rigid cast.

16. An article of manufacture for use as a surgical cast which comprises;
   a sealed pliable envelope having a plurality of polystyrene beads and a dormant semi-prepolymer resin contained therein which upon activation of the semi-prepolymer produces a substantially rigid cast.

17. An article of manufacture for use as a surgical cast which comprises;
   a sealed pliable envelope having a low-density particulate filler material, a normally dormant hardenable binding agent and a sealed capsule of activating agent for said binding agent contained therein which upon introduction of said activating agent to said binding agent produces a substantially rigid cast.

18. An article of manufacture for use as a surgical cast which comprises;
   a sealed pliable envelope having a plurality of polystyrene beads, a dormant hardenable epoxy resin and a sealed capsule of resin activator contained therein which upon introduction of said activator to said resin produces a substantially rigid cast.

19. An article of manufacture for use as a surgical cast which comprises;
   a sealed pliable envelope having a plurality of polystyrene beads, a dormant hardenable semi-prepolymer and a sealed capsule of polyol activator contained therein which upon introduction of the polyol activator to the semi-prepolymer produces a substantially rigid cast.

References Cited

UNITED STATES PATENTS

| | | | |
|---|---|---|---|
| 2,864,492 | 12/1958 | Lappala | 206—47 |
| 2,982,396 | 5/1961 | Shihadeh | 206—47 |
| 3,048,169 | 8/1962 | Pierce | 128—90 |
| 3,148,679 | 9/1964 | Witcher | 128—90 |
| 3,149,943 | 9/1964 | Amador | 62—4 |
| 3,208,102 | 9/1965 | Rubio | 18—5.1 |
| 3,212,497 | 10/1965 | Dickerson | 128—87 |

RICHARD A. GAUDET, *Primary Examiner.*

J. W. HINEY, R. L. FRINKS, *Assistant Examiners.*